(12) United States Patent
Inoue et al.

(10) Patent No.: US 12,407,755 B2
(45) Date of Patent: Sep. 2, 2025

(54) COMMUNICATION SYSTEM, COMPUTING MACHINE, COMMUNICATION METHOD AND PROGRAM

(71) Applicant: Nippon Telegraph and Telephone Corporation, Tokyo (JP)

(72) Inventors: Kiwami Inoue, Musashino (JP); Junki Ichikawa, Musashino (JP); Yukio Tsukishima, Musashino (JP); Kenji Shimizu, Musashino (JP); Hideki Nishizawa, Musashino (JP); Toru Mano, Musashino (JP); Tomoya Hibi, Musashino (JP)

(73) Assignee: NTT, Inc., Tokyo (JP)

( * ) Notice: Subject to any disclaimer, the term of this patent is extended or adjusted under 35 U.S.C. 154(b) by 44 days.

(21) Appl. No.: 18/688,109

(22) PCT Filed: Sep. 2, 2021

(86) PCT No.: PCT/JP2021/032312
§ 371 (c)(1),
(2) Date: Feb. 29, 2024

(87) PCT Pub. No.: WO2023/032127
PCT Pub. Date: Mar. 9, 2023

(65) Prior Publication Data
US 2025/0039262 A1    Jan. 30, 2025

(51) Int. Cl.
*H04L 12/24* (2006.01)
*H04L 41/0803* (2022.01)
*H04L 67/1097* (2022.01)

(52) U.S. Cl.
CPC ............... *H04L 67/1097* (2013.01)

(58) Field of Classification Search
CPC .............. H04L 67/1097; G06F 13/28
(Continued)

(56) References Cited

U.S. PATENT DOCUMENTS

| 11,909,628 | B1 * | 2/2024 | Friedman | ............ H04L 45/24 |
| 2007/0206598 | A1 * | 9/2007 | Yamada | ............ H04L 1/1835 |
| | | | | 370/392 |

(Continued)

OTHER PUBLICATIONS

Masahiko et al., "Photonic Transport Network Architecture and Control Management Technology," NTT Technical Journal, Oct. 2007, 20 pages (with machine translation).

(Continued)

*Primary Examiner* — Ario Etienne
*Assistant Examiner* — Elizabeth Kassa
(74) *Attorney, Agent, or Firm* — Fish & Richardson P.C.

(57) ABSTRACT

A communication system includes a plurality of computing machines 1 and 2 connected to an optical network, in which the optical network includes a main signal communication path 4 and a control communication path 3. Each of the computing machines 1 and 2 includes a control unit 14 that sets a remote direct memory access (RDMA) communication path, and a communication unit 11 that transmits a setting request including setting information of the RDMA communication path set by the control unit 14 and setting information for setting the main signal communication path 4 to a computing machine of an access destination via the control communication path 3; and a main signal transmitting/receiving unit 16 that establishes the main signal communication path 4 based on the setting information of the main signal communication path 4.

5 Claims, 8 Drawing Sheets

(58) Field of Classification Search
USPC .......................................................... 709/217
See application file for complete search history.

(56) References Cited

U.S. PATENT DOCUMENTS

| | | | | |
|---|---|---|---|---|
| 2008/0141043 | A1* | 6/2008 | Flynn | G06F 11/108 |
| | | | | 711/E12.04 |
| 2012/0072607 | A1* | 3/2012 | Kawashima | H04L 69/18 |
| | | | | 709/230 |
| 2014/0270776 | A1* | 9/2014 | Jinno | H04J 14/0238 |
| | | | | 398/69 |
| 2015/0071635 | A1* | 3/2015 | Naito | H04Q 11/0066 |
| | | | | 398/49 |
| 2015/0248366 | A1* | 9/2015 | Bergsten | G06F 13/4221 |
| | | | | 710/308 |
| 2016/0062943 | A1* | 3/2016 | Nikami | G06F 13/4282 |
| | | | | 710/106 |
| 2018/0102978 | A1* | 4/2018 | Shen | H04L 69/14 |
| 2020/0125529 | A1* | 4/2020 | Byers | G06F 13/28 |
| 2020/0371700 | A1* | 11/2020 | Stabrawa | G06F 3/0631 |

OTHER PUBLICATIONS

Recio et al., "A Remote Direct Memory Access Protocol Specification," Network Working Group, Request for Comments 5040, Oct. 2007, 66 pages.

Takahashi et al., "Toward virtual machine image storage using RDMA," Information Processing Society of Japan Computer System Symposium, Nov. 2014, 10 pages (with English abstract).

Takefusa et al., "An Experiment of Co-allocating Computing and Lambda Path Resources on the Grid," Research Report of Information Processing Society of Japan, 2006-ARC-167 2006-HPC-105, 6 pages (English abstract only).

* cited by examiner

COMMUNICATION SYSTEM, COMPUTING MACHINE, COMMUNICATION METHOD AND PROGRAM

CROSS-REFERENCE TO RELATED APPLICATIONS

This application is a National Stage application under 35 U.S.C. § 371 of International Application No. PCT/JP2021/032312, having an International Filing Date of Sep. 2, 2021. The disclosure of the prior application is considered part of the disclosure of this application, and is incorporated by reference in its entirety into this application.

TECHNICAL FIELD

The present invention relates to a communication system, a computing machine, a communication method, and a program.

BACKGROUND ART

In data communication between computing systems having a relatively short communication distance therebetween in a data center or the like, a remote direct memory access (RDMA) technology is used in which data is transferred between computing machines by accessing a memory without involving a CPU in order to increase a communication processing speed (Non-Patent Literature 1). Since direct connection of the computing machines to an optical network by an optical waveguide results in having no effect of a signal loss on a relay node, RDMA can be applied to long-distance data communication.

In optical communication, with the spread of 5G, a distributed control method and a centralized control method for dynamically setting or cancelling an optical communication path in response to various communication requests generated between geographically distributed computing machines have been studied (Non-Patent Literatures 2 and 3).

CITATION LIST

Non-Patent Literature

Non-Patent Literature 1: IETF, "A Remote Direct Memory Access Protocol Specification", RFC5040, October 2007

Non-Patent Literature 2: Atsuko Takefusa, An Experiment of Co-allocating Computing and Lambda Path Resources on the Grid, IPSJ SIG Technical Reports 2006-ARC-167 2006-HPC-105

Non-Patent Literature 3: Masahiko Jinno, "Photonic Transport Network Architecture to seigyo kanri gijutsu (in Japanese) (Photonic Transport Network Architecture and Control Management Technology)", NTT Technical Review, October 2007

SUMMARY OF INVENTION

Technical Problem

In a computing system connected via an optical network, when data transfer setting is performed by RDMA, a communication path is established for each layer in order from a lower layer to an upper layer in a general communication method.

When RDMA communication is started, first, a main signal communication path of a layer 1 of the lowest layer is established, and then an RDMA communication path of an upper layer is established. Although about several minutes are required to set the main signal communication path of the layer 1, the RDMA communication path is set after completion of the setting of the layer 1.

Therefore, when the main signal communication path and the RDMA communication path are dynamically established in response to a request from a user, it is a problem that it takes time before the RDMA communication becomes possible.

The present invention has been made in view of the above circumstances, and an object of the present invention is to shorten a time required to start RDMA communication.

Solution to Problem

In order to achieve the above-described object, according to an aspect of the present invention, there is provided a communication system including a plurality of computing machines connected to an optical network. The optical network includes a main signal communication path and a control communication path. Each computing machine includes a control unit that sets a remote direct memory access (RDMA) communication path, a communication unit that transmits a setting request containing setting information of the RDMA communication path set by the control unit and setting information for setting the main signal communication path to a computing machine of an access destination via the control communication path, and a main signal transmitting/receiving unit that establishes the main signal communication path based on the setting information of the main signal communication path.

According to another aspect of the present invention, there is provided a computing machine connected to a computing machine of an access destination via an optical network, in which the optical network includes a main signal communication path and a control communication path, the computing machine including: a control unit that sets a remote direct memory access (RDMA) communication path; a communication unit that transmits a setting request including setting information of the RDMA communication path set by the control unit and setting information for setting the main signal communication path to the computing machine of the access destination via the control communication path; and a main signal transmitting/receiving unit that establishes the main signal communication path based on the setting information of the main signal communication path.

According to another aspect of the present invention, there is provided a communication method performed by a communication system including a plurality of computing machines connected to an optical network. The optical network includes a main signal communication path and a control communication path. Each computing machine performs a step of setting a remote direct memory access (RDMA) communication path, a step of transmitting a setting request containing setting information set in the step of the setting and setting information for setting the main signal communication path to a computing machine of an access destination via the control communication path, and a step of establishing the main signal communication path based on the setting information of the main signal communication path.

According to another aspect of the present invention, there is provided a program for causing a computer to function as the above-described computing machine.

Advantageous Effects of Invention

According to the present invention, a time required to start the RDMA communication can be shortened.

DESCRIPTION OF EMBODIMENTS

Hereinafter, embodiments of the present invention will be described with reference to the drawings.

<Configuration of Communication System>

Figure 1:
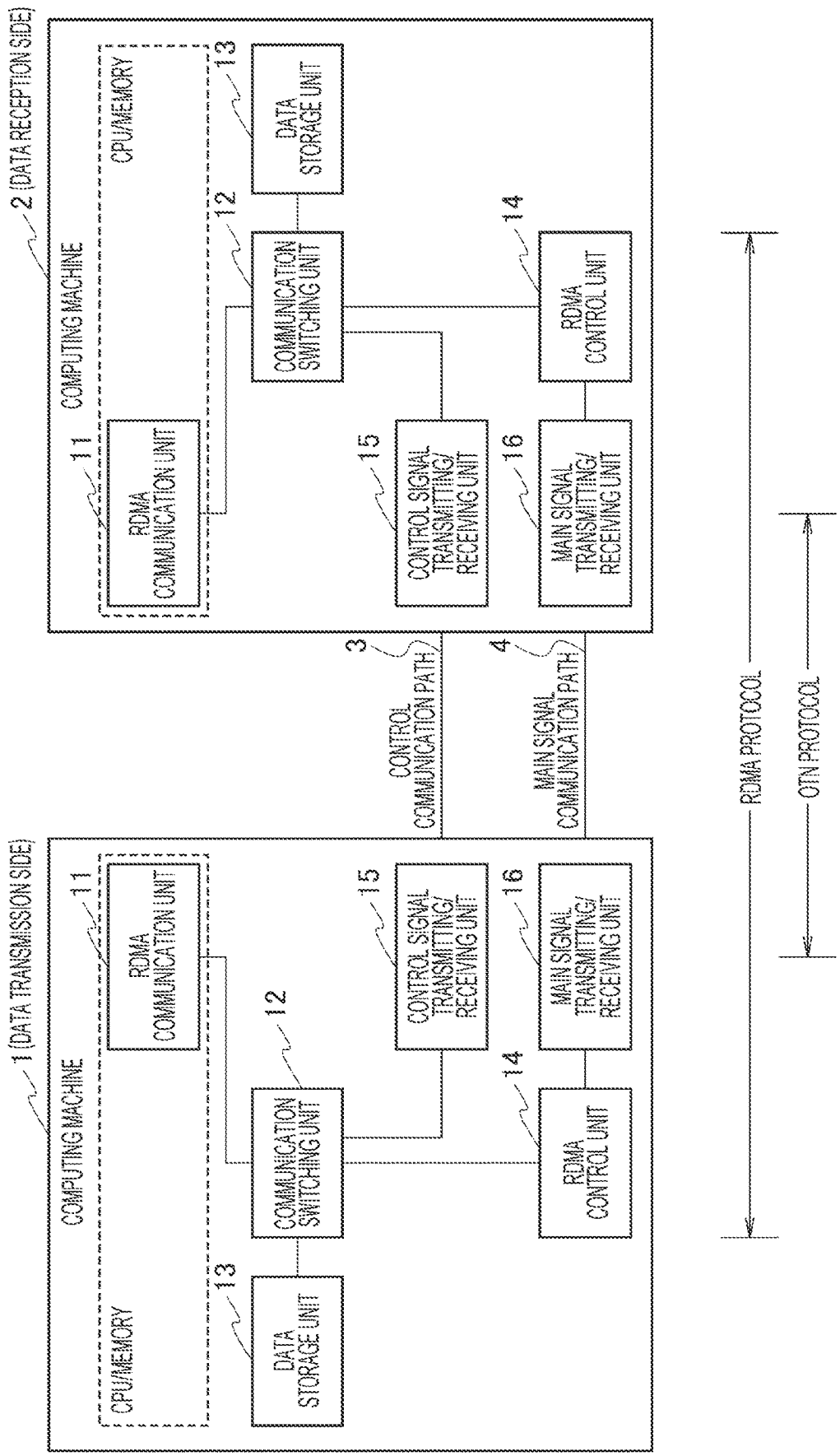
FIG. 1 is a diagram illustrating a configuration of a communication system according to an embodiment of the present invention.

FIG. 1 is a system configuration diagram illustrating a communication system according to an embodiment of the present invention. The communication system of the embodiment includes a plurality of computing machines 1 and 2 connected to an optical network (optical transfer line).

The optical network includes a control communication path 3 and a main signal communication path 4. The control communication path 3 is a communication path for transferring a control signal. The main signal communication path 4 is a large-capacity and low-delay communication path of a layer 1 (lower layer). It is assumed that the control communication path 3 is always set and the main signal communication path 4 is dynamically set in response to a request from a user.

The computing machines 1 and 2 perform data transfer by remote direct memory access (RDMA) communication. The RDMA communication is communication for transferring data from a memory of one computing machine 1 to a memory of the other computing machine by direct memory access (DMA). In the RDMA communication, since data is transferred without passing through operating systems of the computing machines 1 and 2, the data transfer can be realized with high throughput and low latency.

In the embodiment, as an upper layer of the main signal communication path 4 (OTN protocol) of the layer 1, an RDMA communication path (RDMA protocol) is set on the main signal communication path 4 to the computing machines 1 and 2 in an end-to-end manner. That is, the communication system of the embodiment realizes transfer of RDMA over Layer 1.

Each of the computing machines 1 and 2 includes an RDMA communication unit 11 (communication unit), a communication switching unit 12, a data storage unit 13, an RDMA control unit 14 (control unit), a control signal transmitting/receiving unit 15, and a main signal transmitting/receiving unit 16.

The RDMA communication unit 11 is an application that performs RDMA communication. The RDMA communication unit 11 is installed by using a CPU and a memory. The RDMA communication unit 11 controls setting and cancelling of the main signal communication path 4. For example, the RDMA communication unit 11 of the computing machine 1 transmits a setting request (control message) including setting information of the RDMA communication path set by the RDMA control unit 14 and setting information for setting the main signal communication path 4 to a computing machine 2 of an access destination via the control communication path 3. The setting request of the embodiment is a request for setting the RDMA communication path and the main signal communication path 4. The RDMA communication unit 11 instructs the RDMA control unit 14 to set the RDMA communication path.

The communication switching unit 12 is, for example, a root complex, a PCI switch, or the like, and switches a communication destination device of the RDMA communication unit 11.

The data storage unit 13 is a memory, a storage, or the like, and stores various data. When the data storage unit 13 is a memory, the RDMA communication unit 11 operates on the data storage unit 13.

The RDMA control unit 14 controls data transfer by the RDMA communication. A direct memory access (DMA) controller can be used as the RDMA control unit 14. The DMA controller is a dedicated application (IC chip) that controls DMA transfer and is installed on, for example, a field programmable gate array network interface card (FPGA NIC). The RDMA control unit 14 of the embodiment sets the RDMA communication path. Specifically, the RDMA control unit 14 secures a memory area for the RDMA communication based on an instruction from the RDMA communication unit 11, notifies the RDMA communication unit 11 of setting information including the secured memory area, and sets the RDMA communication path.

The control signal transmitting/receiving unit 15 transmits and receives a control signal flowing through the control communication path 3. A network interface card (NIC) can be used as the control signal transmitting/receiving unit 15.

The main signal transmitting/receiving unit 16 transmits and receives a main signal flowing through the main signal communication path 4. As the main signal transmitting/receiving unit 16, an NIC equipped with a laser or the like can be used. The main signal transmitting/receiving unit 16 establishes the main signal communication path 4 based on the setting information of the main signal communication path 4.

<Setting Process of Communication Path>

Next, setting processes of the main signal communication path 4 and the RDMA communication path will be described. It is assumed that the control communication path 3 is set in advance. The setting processes of the main signal communication path 4 and the RDMA communication path include the following processes A, B, and C. The processes A and B and the process C can be performed in parallel.

Process A: The computing machines 1 and 2 that perform RDMA communication transmit and receive a control message (setting request and setting response) for setting the main signal communication path 4 via the control communication path 3.

Process B: The computing machines 1 and 2 set the main signal communication path 4 based on the control message.

Process C: The computing machines 1 and 2 transmit and receive a control message (setting request and setting response) for setting the RDMA communication path and set the RDMA communication path.

Figure 2:
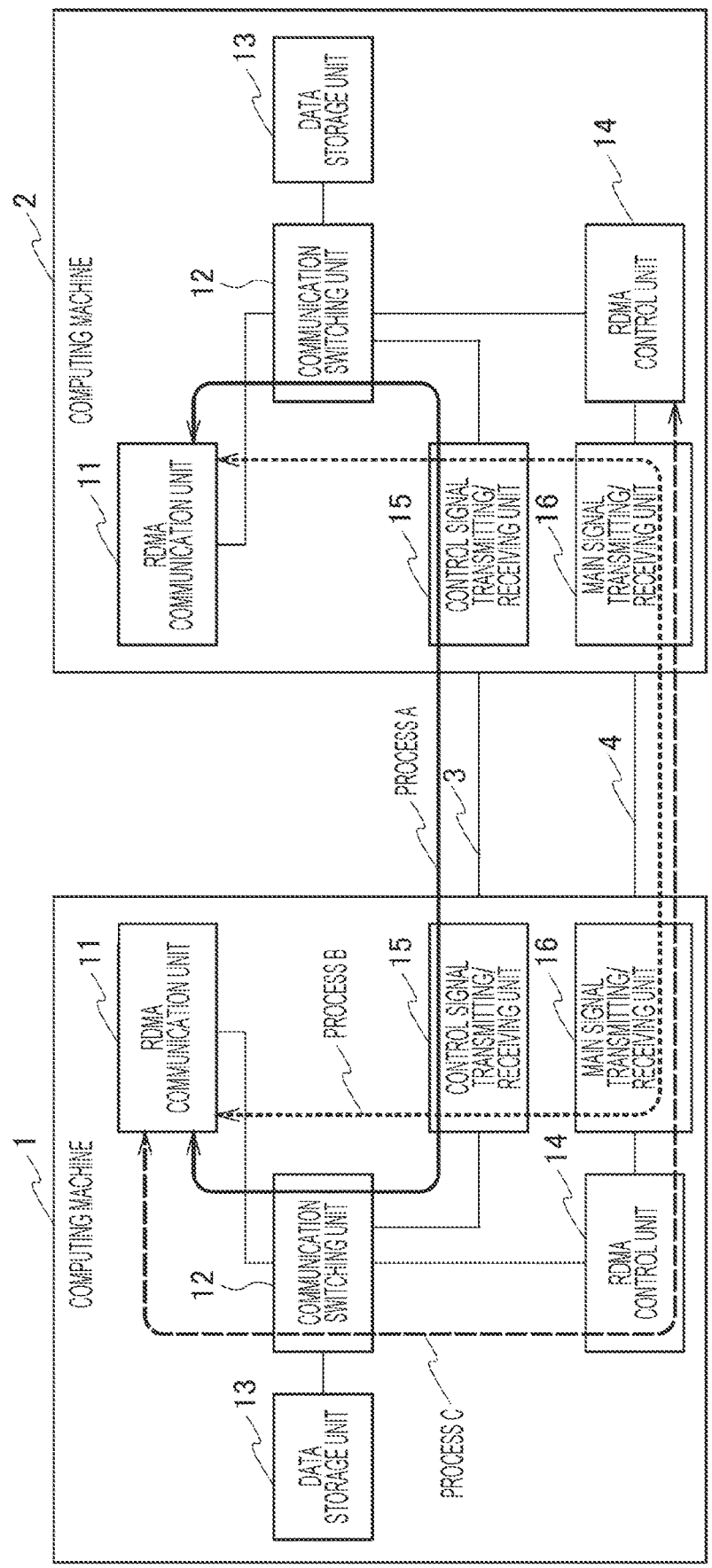
FIG. 2 is an explanatory diagram for explaining a setting process of a communication path according to a comparative example.

FIG. 2 is an explanatory diagram for explaining a setting process of a communication path in a comparative example of the embodiment. In FIG. 2, the main signal communication path 4 and the RDMA communication path are sequentially set in the order of the process A, the process B, and the process C. That is, the communication paths are established in order from a lower layer to an upper layer for each layer, and the setting of the RDMA communication path in the process C is not started until the main signal communication path 4 is established. In the comparative example, the process C is performed via the main signal communication path 4.

Therefore, the time until the RDMA communication path is established is the sum of the respective processing times of the process A, the process B, and the process C, and a long time is required from the start of the setting process to the start of the RDMA communication. A processing time of the process B is as long as several minutes.

Figure 3:
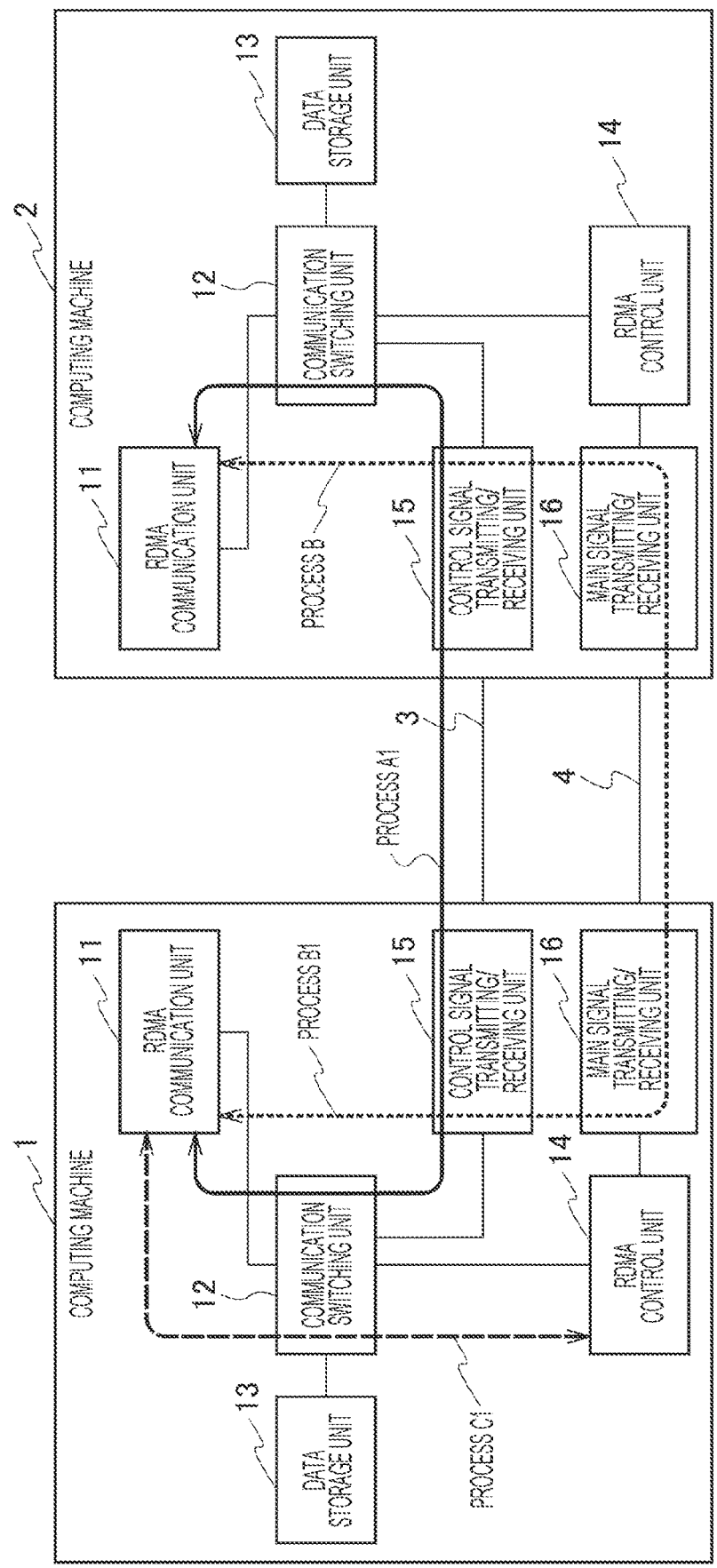
FIG. 3 is an explanatory diagram for explaining a setting process of a communication path according to the embodiment.

FIG. 3 is an explanatory diagram for explaining a setting process of a communication path according to the embodiment.

In the embodiment, a setting request for the RDMA communication path in the process C and a setting request for the main signal communication path 4 in the process A are collectively transmitted as one setting request. The control communication path 3 is used not only to set the main signal communication path 4 but also to set the RDMA communication path. The control communication path 3 is established in advance in order to set (or cancel) the main signal communication path 4. Consequently, in the embodiment, the time from the start of the setting process to the start of the RDMA communication can be shortened.

In the embodiment, first, the RDMA communication unit 11 and the RDMA control unit 14 of the computing machine 1 perform setting of the RDMA communication path in a process C1. The RDMA communication unit 11 of the computing machine 1 sends a setting instruction of the RDMA communication path to the RDMA control unit 14. The RDMA control unit 14 secures a memory area for RDMA communication based on the instruction and notifies the RDMA communication unit 11 of setting information including the memory area.

Next, in a process A1, the RDMA communication unit 11 of the computing machine 1 transmits a setting request including the setting information of the RDMA communication path notified from the RDMA control unit 14 and the setting information for setting the main signal communication path 4 to the computing machine 2 of the access destination via the control signal transmitting/receiving unit 15 and the control communication path 3. The computing machine 2 receives the setting request and transmits a setting response of the RDMA communication path and a setting response of the main signal communication path 4 to the computing machine 1.

Then, in process B1, the RDMA communication unit 11 of the computing machine 1 controls the main signal transmitting/receiving unit 16 to establish the main signal communication path 4, in cooperation with the computing machine 2 of the access destination based on the setting response of the main signal communication path 4. Consequently, the RDMA communication path is established on the main signal communication path 4.

In the embodiment, the setting request of the RDMA communication path and the setting request of the main signal communication path 4 are collectively transmitted as one control message via the control communication path 3. Consequently, the time until the RDMA communication path is established and the RDMA communication is started can be shortened as compared with the comparative example of FIG. 2.

Figure 4:
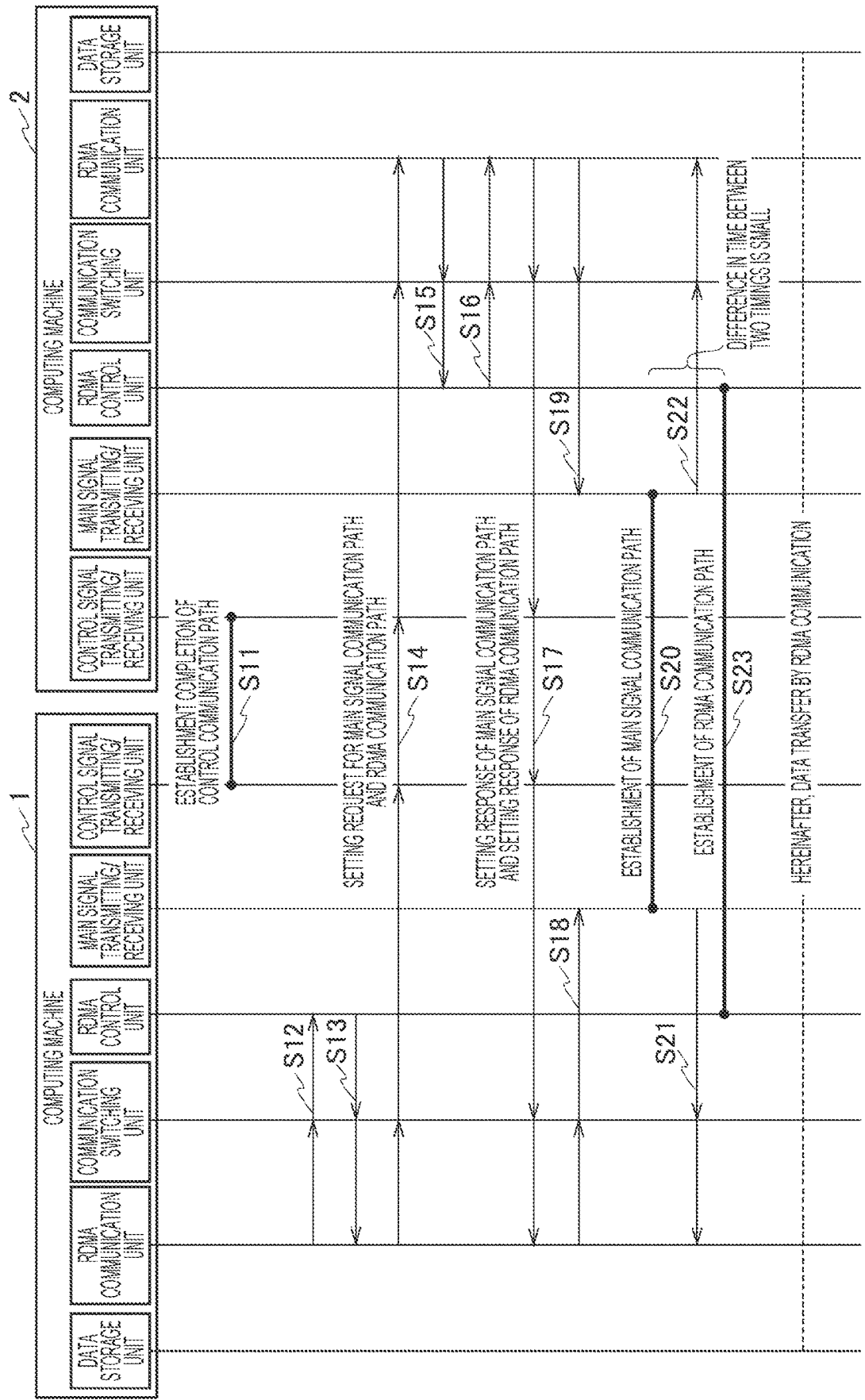
FIG. 4 is a sequence diagram illustrating a setting process of the communication path according to the embodiment.

FIG. 4 is a sequence diagram illustrating a setting process of the communication path according to the embodiment in FIG. 3.

The control communication path 3 is established between the computing machines 1 and 2 in advance (S11).

Upon receiving a request of the user, the RDMA communication unit 11 of the computing machine 1 acquires a transmission source address and a transmission destination address and sends the setting instruction for setting the RDMA communication path to the RDMA control unit 14 (S12). In the request of the user, a node identifier of the computing machine 2 of the access destination is designated.

The RDMA control unit 14 performs setting such as securing a memory for RDMA in accordance with the setting instruction and sends setting information (setting result) to the RDMA communication unit 11 (S13).

The RDMA communication unit 11 of the computing machine 1 transmits a setting request including the setting information of the RDMA communication path and the setting information for setting the main signal communication path 4 to the computing machine 2 via the control signal transmitting/receiving unit 15 and the control communication path 3 (S14).

The main signal communication path 4 (optical path) can be set or cancelled using distributed control such as generalized multi-protocol label switching (GMPLS) (Non-Patent Literature 2) or centralized control such as software defined network (SDN) or network management system (NMS)/ element management system (EMS) (Non-Patent Literature 3).

When the distributed control of the GMPLS is used, the setting information (setting request) of the main signal communication path 4 includes a message identifier (session ID), a node identifier of a local end point of the main signal communication path 4, a node identifier of a remote end point of the main signal communication path 4, an adjacent hop/end point identifier, a wavelength label identifier (possibility group), a transfer capacity, or the like.

When the centralized control of the SDN is used, the setting information (setting request) transmitted from the computing machine 1 to the computing machine 2 via the centralized control server (not illustrated) includes a message identifier (session ID), a node identifier of a local end point of the main signal communication path 4, an interface/ end point identifier as a local end point of the main signal communication path 4, a node identifier of a remote end point of the main signal communication path, a wavelength label identifier, a transfer capacity, or the like.

The RDMA communication unit 11 of the computing machine 2 receives the setting request in S14 via the control signal transmitting/receiving unit 15. The RDMA communication unit 11 sends a setting instruction for setting the RDMA communication to the RDMA control unit 14 (S15). The setting instruction includes setting information of the RDMA communication path included in the setting request.

The RDMA control unit 14 performs setting such as securing a memory for RDMA in accordance with the setting instruction and sends setting information to the RDMA communication unit 11 (S16). Consequently, the RDMA communication path is set. The RDMA communication unit 11 transmits a setting response including the setting information of the RDMA communication path to the computing machine 1 via the control signal transmitting/receiving unit 15 and the control communication path 3 (S17).

In addition, the RDMA communication unit 11 of the computing machine 2 sets the main signal communication path 4 based on the setting information of the main signal communication path 4 which is included in the setting request of S14. The RDMA communication unit 11 transmits a setting response including the setting information of the main signal communication path 4 to the computing machine 1 via the control signal transmitting/receiving unit 15 and the control communication path 3 (S17).

When the distributed control of GMPLS is used, the setting information (setting response) of the main signal communication path 4 transmitted by the computing machine 2 includes a message identifier (session ID), a node identifier of a local end point of the main signal communication path 4, a node identifier of a remote end point of the main signal communication path 4, an adjacent hop/end point identifier, a transfer capacity, an adjacent hop/end point identifier and a wavelength label identifier determined as the main signal communication path 4, or the like.

When the centralized control of the SDN is used, the setting information (setting response) of the main signal communication path 4 transmitted to the computing machine 1 via the centralized control server includes a message identifier (session ID), a node identifier of a local end point of the main signal communication path 4, an interface/end point identifier as a local end point of the main signal communication path 4, a node identifier of a remote end point of the main signal communication path, a wavelength label identifier, a transfer capacity, or the like.

The RDMA communication unit 11 of the computing machine 1 receives both of the setting response of the RDMA communication path and the setting response of the main signal communication path 4. When receiving the setting response of the main signal communication path 4, the RDMA communication unit 11 of the computing machine 1 instructs the main signal transmitting/receiving unit 16 to activate the main signal communication path 4 (S18). After transmitting the setting response of the main signal communication path 4, the RDMA communication unit 11 of the computing machine 2 instructs the main signal transmitting/receiving unit 16 to activate the main signal communication path 4 (S19).

The main signal transmitting/receiving unit 16 of each of the computing machines 1 and 2 establishes the main signal communication path 4 based on the setting information of the setting request and the setting response of the main signal communication path 4 (S20). A long time of about several minutes is required from when each of the main signal transmitting/receiving units 16 receives an activation instruction to when the main signal communication path 4 is actually established.

After establishing the main signal communication path 4, each of the main signal transmitting/receiving units 16 of the computing machines 1 and 2 sends a response to the activation instruction to the RDMA communication unit 11 (S21 and S22). Consequently, the RDMA communication path is established on the main signal communication path 4 (S23), and RDMA communication is started. In the embodiment, since the RDMA communication path is set before the main signal communication path 4 is established, the time from the establishment of the main signal communication path 4 in S20 to the setting of the RDMA communication path in S23 can be shortened.

Figure 5:
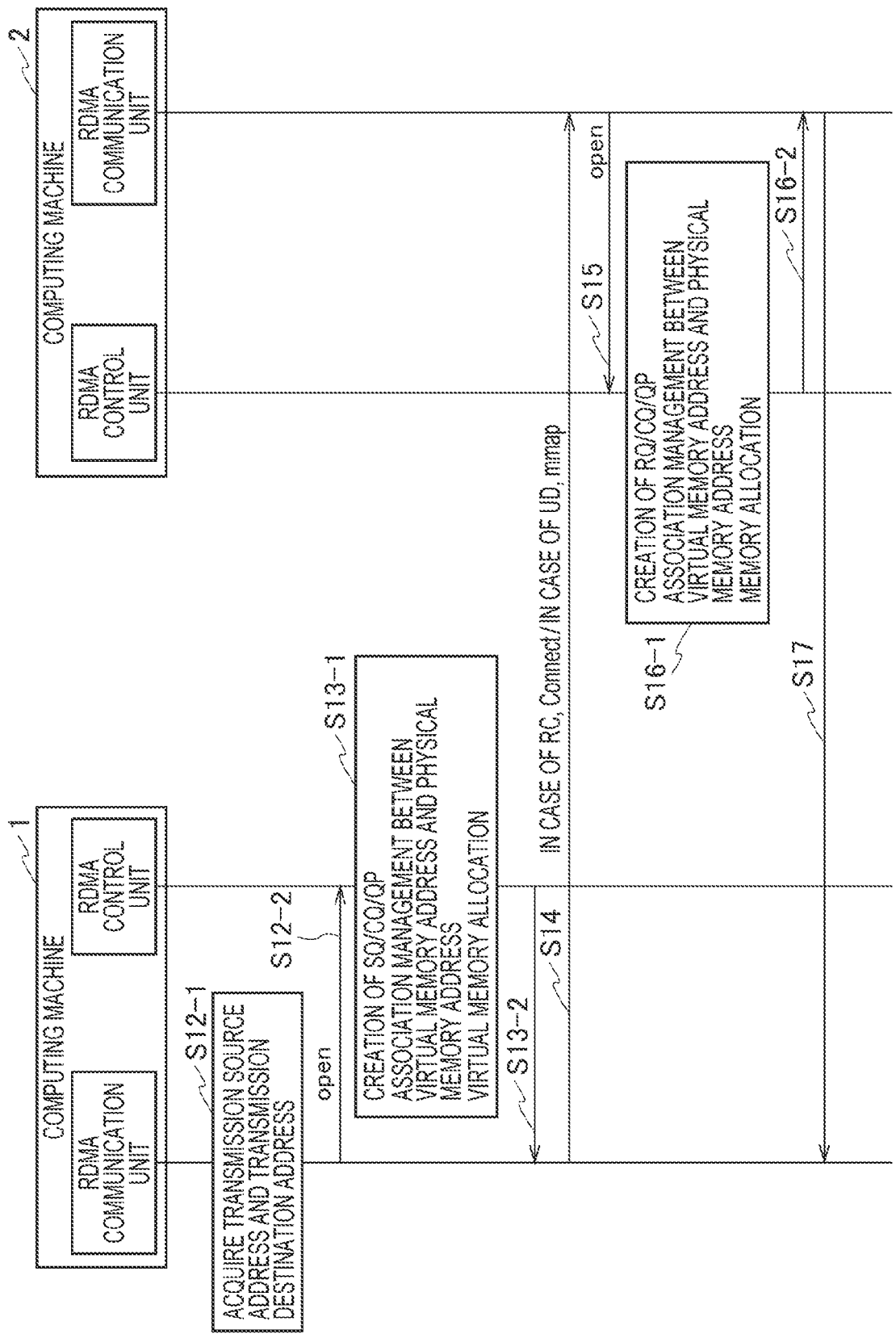
FIG. 5 is a sequence diagram illustrating setting of an RDMA communication path in S12 to S17 in FIG. 4 in detail.

FIG. 5 is a sequence diagram illustrating details of the setting process of the RDMA communication path which is performed by the RDMA communication unit 11 and the RDMA control unit 14 in S12 to S17 in FIG. 4.

The RDMA communication unit 11 of the computing machine 1 acquires a transmission source address and a transmission destination address (S12-1) and sends the setting instruction of the RDMA communication path to the RDMA control unit 14 (S12-2). The setting instruction (for example, "open") includes the following instruction.

Creation of send queue (SQ), completion queue (CQ), and queue pair (QP)
    Association between virtual memory address and physical memory address
    Memory allocation The RDMA control unit 14 performs setting such as securing a memory for RDMA according to the setting instruction (S13-1) and sends setting information (setting result) to the RDMA communication unit 11 (S13-2).

The RDMA communication unit 11 transmits a setting request including the setting information of the RDMA communication path to the computing machine 2 via the control communication path 3 (S14). The setting information includes setting information set in accordance with the setting instruction. As the setting request for the RDMA communication path, for example, "Connect" is used when the service type is reliable connection (RC) and "mmap" is used when the service type is unreliable datagram (UD). The setting request of the embodiment also includes setting information of the main signal communication path 4.

Upon receiving the setting request via the control communication path 3, the RDMA communication unit 11 of the computing machine 2 sends a setting instruction of the RDMA communication path to the RDMA control unit 14 (S15). The setting instruction (for example, "open") includes the following instruction.

Creation of receive queue (RQ), completion queue (CQ), and queue pair (QP)
    Association between virtual memory address and physical memory address
    Memory allocation The RDMA control unit 14 performs setting such as securing a memory for RDMA in accordance with the setting instruction (S16-1) and sends the setting information to the RDMA communication unit 11 (S16-2).

The RDMA communication unit 11 transmits a setting response including the setting information of the RDMA communication path to the computing machine 1 via the control communication path 3 (S17). Consequently, the RDMA communication path is set.

Figure 6:
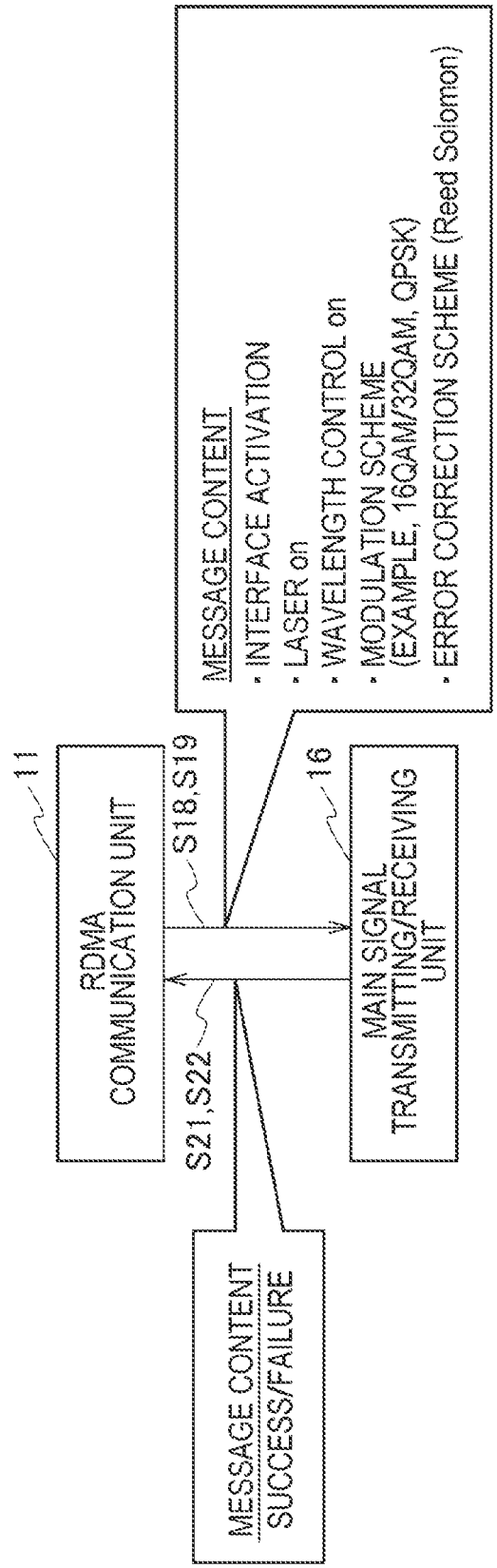
FIG. 6 is an explanatory diagram for explaining messages of S18 and S21 in FIG. 4.

FIG. 6 is an explanatory diagram illustrating messages between the RDMA communication unit 11 and main signal transmitting/receiving unit 16 in 318 and S21 (or S19 and S22) in FIG. 4.

The RDMA communication unit 11 sends a message including the following items to the main signal transmitting/receiving unit 16 as an activation instruction in S18 and S19.

Interface activation
    Laser on
    Wavelength control on
    Modulation scheme (example, 16QAM/32QAM, QPSK)
    Error correction scheme (Reed Solomon)

Further, in the case of an instruction to stop the main signal communication path 4, the messages are "interface stop", "laser off", and "wavelength control off".

As a response to S21 and S22, the main signal transmitting/receiving unit 16 sends a message indicating a processing result as to whether the establishment of the main signal communication path 4 has succeeded or failed.

In the embodiment illustrated in FIG. 4, the RDMA communication unit 11 of the computing machine 1 integrates the setting request of the RDMA communication path and the setting request of the main signal communication path 4 into one setting request and transmits the integrated setting request to the computing machine 2 of the access destination. Consequently, the time until the start of the RDMA communication can be shortened as compared with the case where the setting request of the RDMA communication path is transmitted after the main signal communication path 4 is established.

Figure 7:
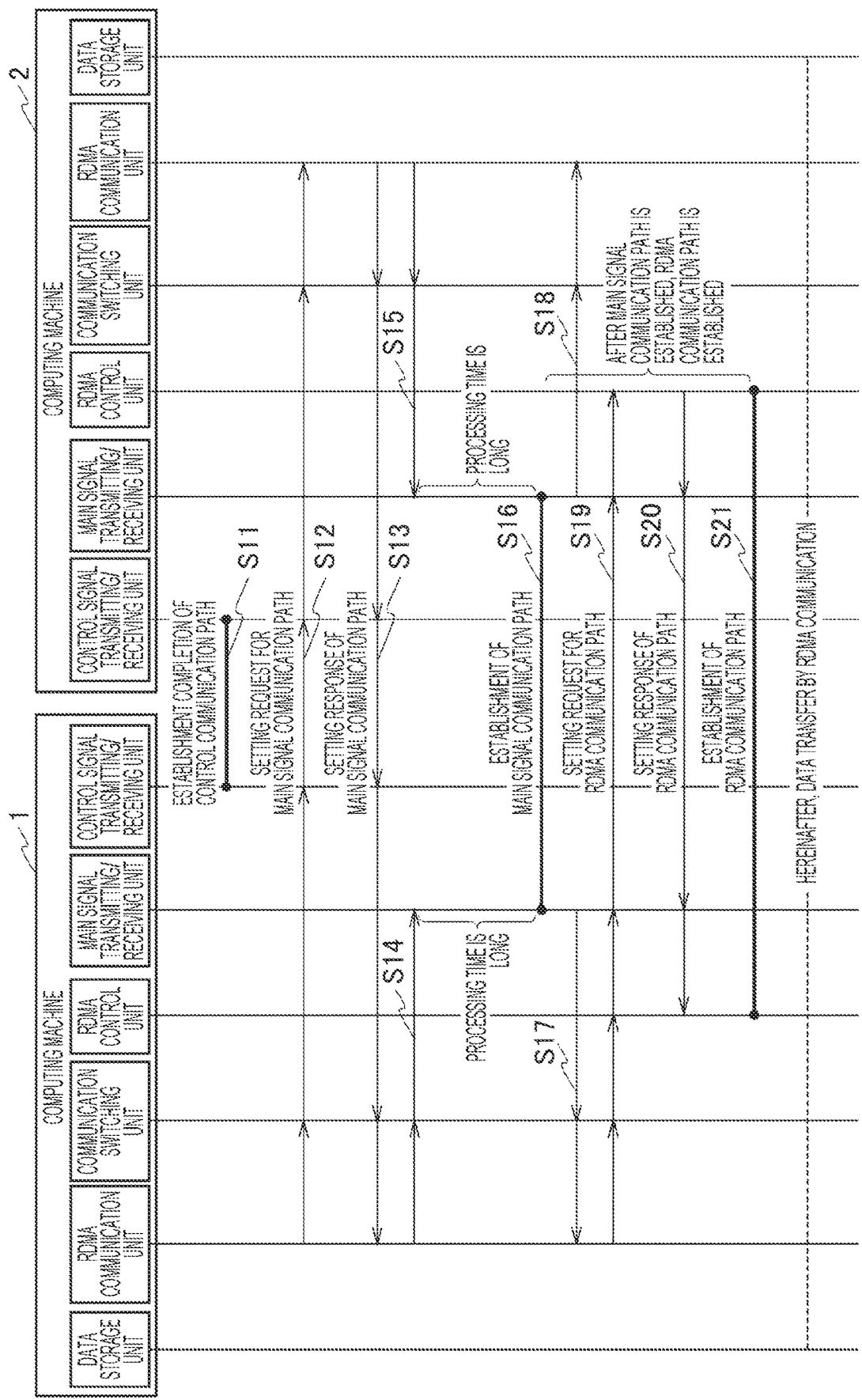
FIG. 7 is a sequence diagram illustrating the setting process of the communication path according to the comparative example of FIG. 2.

On the other hand, FIG. 7 is a sequence diagram illustrating a setting process of a communication path according to the comparative example illustrated in FIG. 2. In the illustrated sequence diagram, a setting request for setting the main signal communication path 4 is transmitted and received in S12 to S13 (process A), the main signal communication path 4 is set in S14 to S18 (process B), and the RDMA communication path is set in S19 to S21 (process C). The setting request of the RDMA communication path (S19) in the comparative example is transmitted via the main signal communication path 4 after the main signal communication path 4 is established. Therefore, the time until the RDMA communication path is established is longer than that in the embodiment illustrated in FIG. 4.

<Operations and Effects>

The communication system of the embodiment described above is a communication system including the plurality of computing machines 1 and 2 connected to the optical network, in which the optical network includes the main signal communication path 4 and the control communication path 3, and the each of the computing machines 1 and 2 includes the RDMA control unit 14 that sets the RDMA communication path, the RDMA communication unit 11 that transmits the setting request including the setting information of the RDMA communication path set by the RDMA control unit 14 and the setting information for setting the main signal communication path 4 to the computing machine of the access destination via the control communication path 3, and the main signal transmitting/receiving unit 16 that establishes the main signal communication path 4 based on the setting information of the main signal communication path 4.

As described above, in the embodiment, the setting request for the RDMA communication path and the setting request for the main signal communication path 4 are integrated and collectively transmitted via the control communication path 3. Consequently, in the embodiment, since the setting of the RDMA communication path can progress without waiting for the establishment of the main signal communication path of the layer 1 as in the communication scheme of the comparative example, the data communication of the RDMA can be started in a short time. That is, the time required to start the RDMA communication can be shortened.

<Hardware Configuration>

Figure 8:
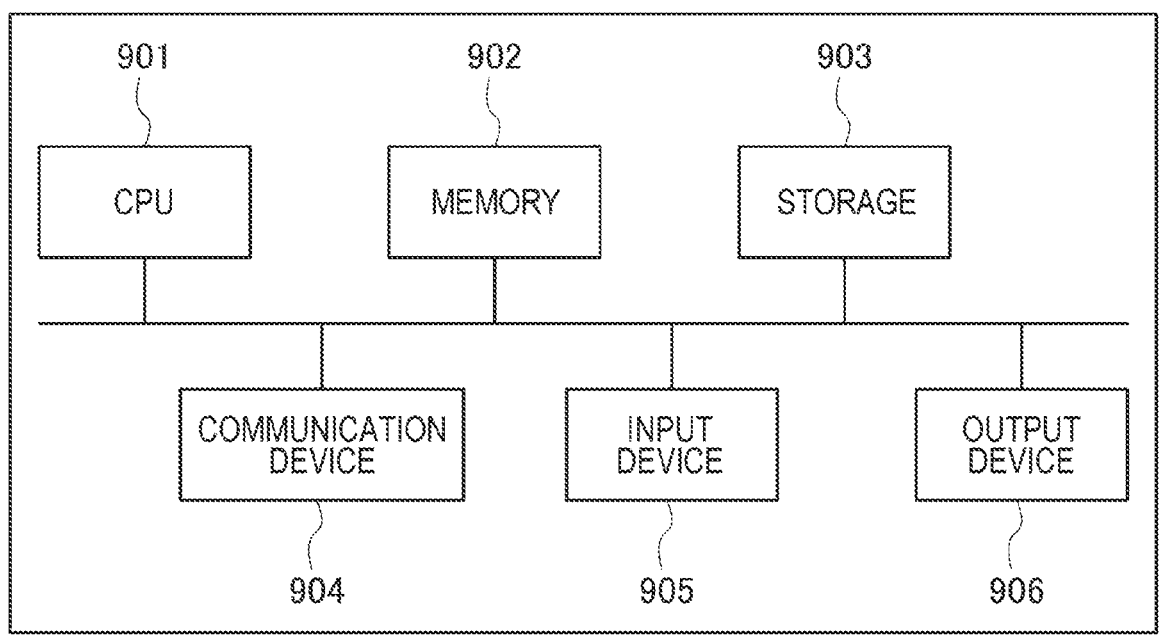
FIG. 8 illustrates an example of a hardware configuration.

As the computing machines 1 and 2 described above, for example, a general-purpose computer system as illustrated in FIG. 8 can be used. The computer system illustrated in the drawing includes a central processing unit (CPU or processor) 901, a memory 902, a storage 903 (hard disk drive (HDD) or solid state drive (SSD)), a communication device 904, an input device 905, and an output device 906. The memory 902 and the storage 903 are storage devices. In the computer system, the CPU 901 executes a predetermined program loaded on the memory 902, and thereby functions of each of the computing machines 1 and 2 are realized.

In addition, the computing machines 1 and 2 may be implemented by one computer or may be implemented by a plurality of computers. In addition, the computing machines 1 and 2 may be a virtual machine that is implemented in a computer. The program for the computing machines can be stored in a computer-readable recording medium such as an HDD, an SSD, a Universal Serial Bus (USB) memory, a compact disc (CD), or a digital versatile disc (DVD), or can be distributed via a network.

Further, the present invention is not limited to the above embodiments, and various modifications can be made within the scope of the gist of the present invention.

REFERENCE SIGNS LIST 1, 2 Computing machine
11 RDMA communication unit (communication unit)
12 Communication switching unit
13 Data storage unit
14 RDMA control unit (control unit)
15 Control signal transmitting/receiving unit
16 Main signal transmitting/receiving unit
3 Control communication path
4 Main signal communication path

The invention claimed is:
1. A communication system comprising:
a plurality of computing machines connected to an optical network,
wherein the optical network comprises a main signal communication path that is a lower layer of a communication scheme and a control communication path for transferring a control signal, and
wherein each computing machine comprises
a control unit that sets a remote direct memory access (RDMA) communication path, wherein to set the RDMA communication path, the control unit secures a memory area for RDMA communication,
a communication unit that transmits a setting request including setting information of the RDMA communication path set by the control unit and setting information for setting the main signal communication path to a computing machine of an access destination via the control communication path, and
a main signal transmitting/receiving unit that establishes the main signal communication path based on the setting information of the main signal communication path,
wherein communication unit further establishes the RDMA communication path on the established main signal communication path, wherein the RDMA communication path is an upper layer of the communication scheme.

2. The communication system according to claim 1,
wherein the communication unit instructs the control unit to set the RDMA communication path, and
wherein the control unit notifies the communication unit of setting information including the secured memory area.

3. A computing machine connected to a computing machine of an access destination via an optical network,
    wherein the optical network includes a main signal communication path that is a lower layer of a communication scheme and a control communication path for transferring a control signal,
    wherein the computing machine comprises
        a control unit that sets a remote direct memory access (RDMA) communication path, wherein to set the RDMA communication path, the control unit secures a memory area for RDMA communication;
        a communication unit that transmits a setting request including setting information of the RDMA communication path set by the control unit and setting information for setting the main signal communication path to the computing machine of the access destination via the control communication path; and
        a main signal transmitting/receiving unit that establishes the main signal communication path based on the setting information of the main signal communication path,
    wherein communication unit further establishes the RDMA communication path on the established main signal communication path, wherein the RDMA communication path is an upper layer of the communication scheme.

4. A non-transitory computer-readable storage medium storing a program for causing a computer to function as the computing machine according to claim 3.

5. A communication method performed by a communication system comprising a plurality of computing machines connected to an optical network,
    wherein the optical network comprises a main signal communication path that is a lower layer of a communication scheme and a control communication path for transferring a control signal, and
    wherein each computing machine performs operations comprising:
        setting a remote direct memory access (RDMA) communication path, wherein setting the RDMA communication path comprises securing a memory area for RDMA communication;
        transmitting a setting request including setting information of the RDMA communication path and setting information for setting the main signal communication path to a computing machine of an access destination via the control communication path, and
        establishing the main signal communication path based on the setting information of the main signal communication path; and
        establishing the RDMA communication path on the established main signal communication path, wherein the RDMA communication path is an upper layer of the communication scheme.

* * * * *